(No Model.)
J. FOSCHINBAUR.
BUSHING FOR LOOSE PULLEYS.
No. 277,257. Patented May 8, 1883.
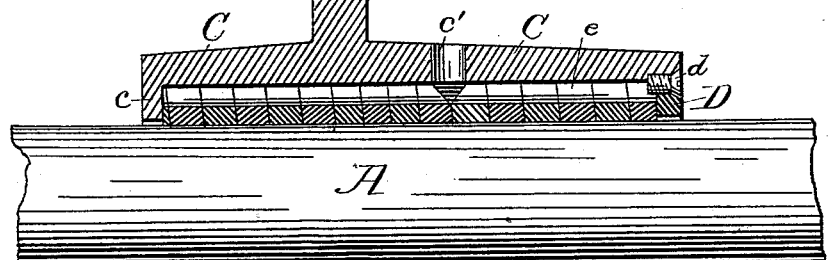
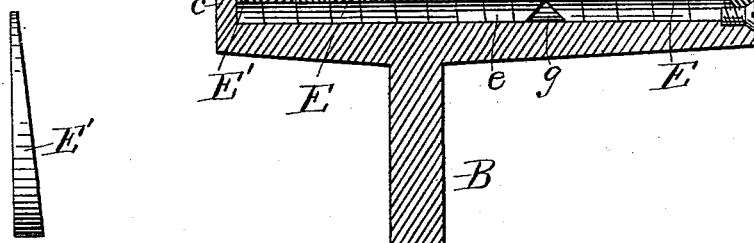
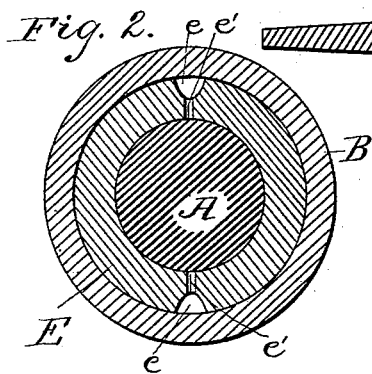
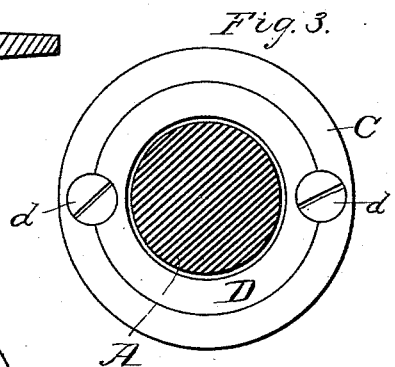
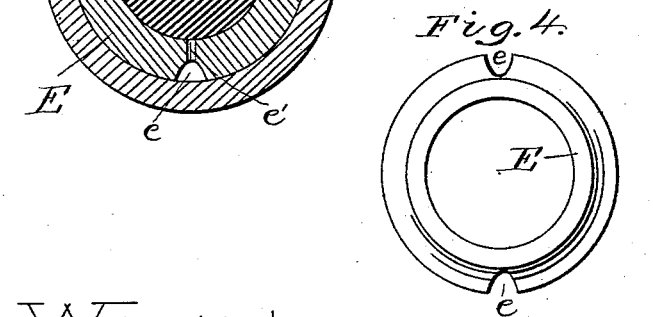

UNITED STATES PATENT OFFICE.

JOSEPH FOSCHINBAUR, OF CHICAGO, ILLINOIS.

BUSHING FOR LOOSE PULLEYS.

SPECIFICATION forming part of Letters Patent No. 277,257, dated May 8, 1883.

Application filed February 26, 1883. (No model.)

*To all whom it may concern:*

Be it known that I, JOSEPH FOSCHINBAUR, of Chicago, county of Cook, and State of Illinois, have invented certain Improvements in Bushings for Loose Pulleys, of which the following is a specification.

The specific devices constituting my invention will be hereinafter described with reference to the accompanying drawings, in which—

Figure 1 represents a side view of a pulley-shaft and a longitudinal central section of a loose pulley in position on the same, and a cross-section of a series of leather rings composing the bushing inside of the hub of the pulley; Fig. 2, a cross-section of the hub, bushing, and shaft; Fig. 3, a cross-section of the shaft and an end view of the hub and collar D; Fig. 4, a side view of one of the leather rings chamfered off around the outer edge to form one-half the channel $g$, and Fig. 5 an edge view of one of the end rings.

A indicates the shaft; B, the pulley; C, the hub of the same; D, a collar, by means of which the hub is closed up and the rings E confined in position after being inserted in the hub, the collar being secured in position by the screws $d$. The openings in the collar D and in the other end of the hub are made a little larger than the shaft, in order that there may be no contact between the former and the latter. The rings E, as shown in Fig. 1, are placed at an inclination to the shaft, instead of being in planes at right angles thereto, in order that the wear of the same upon the shaft may be uniform, and not cut circular grooves therein, as it might otherwise do; and in order that the shaft and the inner peripheries of the rings may be lubricated with oil, two grooves, $e\ e$, are made in the outer periphery of the bushing composed of said rings, extending from end to end, and the circular groove or channel $g$, extending around from the oil-hole $c'$ to the channel $e$ on the opposite side of the bushing, and each ring is provided with a cross groove or depression, $e'$, so as to lead the oil from the channel $e$ to the shaft. The result of this system of channels is that oil poured into the oil-hole $c'$ will be equably distributed along the frictional surface of the shaft, and as the rings are of leather and elastic the quantity of oil distributed may be regulated by compressing the rings together with more or less force by means of the collar D, and the shaft itself is liable to comparatively little wear.

It is manifest that when worn out the bushing can be easily and cheaply replaced.

The rings E', the opposite sides of which are of unequal thickness, are placed upon the ends of the bushing composed of the series of rings, in order to completely fill the hub and hold the rings in the requisite inclined position therein.

What I claim as new and as my own invention is—

1. The described bushing for a loose pulley, composed of a series of rings of leather confined within the hub of the pulley and adapted to turn upon and in contact with a shaft, in combination with pulley B, having hub C, provided with one end open for the insertion of the bushing, and the collar D and its screw $d$, with which to close that end and confine the bushing adjustably, substantially as described.

2. The described bushing, composed of leather rings E, with longitudinal oil-channels $c$, cross-channels $e'$ in the rings themselves, communicating together, and also with oil-hole $c'$, substantially as and for the purpose described.

3. The described bushing, composed of a series of rings of leather adapted to turn, with the hub of the pulley, upon a shaft, the rings being so arranged as to run with their inner edges spirally in reference to the shaft, substantially as described.

JOSEPH FOSCHINBAUR.

Witnesses:
A. M. STOUT,
W. J. BOWEN.